(12) United States Patent
Johnson et al.

(10) Patent No.: US 9,356,691 B2
(45) Date of Patent: May 31, 2016

(54) SAGNAC INTERFEROMETER EVENT SENSING AND LOCATING DEVICE

(71) Applicant: Cleveland Electric Laboratories Co., Twinsburg, OH (US)

(72) Inventors: Scott V. Johnson, Scottsdale, AZ (US); Mike McNeilly, Gilbert, AZ (US)

(73) Assignee: The Cleveland Electric Laboratories Co., Twinsburg, OH (US)

( * ) Notice: Subject to any disclaimer, the term of this patent is extended or adjusted under 35 U.S.C. 154(b) by 339 days.

(21) Appl. No.: 13/967,300

(22) Filed: Aug. 14, 2013

(65) Prior Publication Data

US 2014/0050473 A1 Feb. 20, 2014

Related U.S. Application Data

(60) Provisional application No. 61/684,164, filed on Aug. 17, 2012.

(51) Int. Cl.

| | |
|---|---|
| H04B 10/07 | (2013.01) |
| G01H 1/04 | (2006.01) |
| G02B 6/26 | (2006.01) |
| G01D 5/353 | (2006.01) |
| H04B 10/079 | (2013.01) |
| G01M 11/00 | (2006.01) |
| G02B 6/293 | (2006.01) |
| G01H 9/00 | (2006.01) |
| G08B 13/12 | (2006.01) |

(52) U.S. Cl.
CPC ........ *H04B 10/0791* (2013.01); *G01D 5/35322* (2013.01); *G01H 9/004* (2013.01); *G01M 11/39* (2013.01); *G02B 6/29347* (2013.01); *G08B 13/124* (2013.01)

(58) Field of Classification Search
CPC .......................... G01D 5/3532; G02B 6/29347
See application file for complete search history.

(56) References Cited

U.S. PATENT DOCUMENTS

| | | | | | |
|---|---|---|---|---|---|
| 5,311,592 | A | * | 5/1994 | Udd | ........................ H04B 10/85 380/256 |
| 5,455,698 | A | * | 10/1995 | Udd | ........................ H04B 10/85 398/1 |
| 5,694,114 | A | * | 12/1997 | Udd | ........................ H04B 10/85 250/227.19 |
| 8,289,521 | B2 | * | 10/2012 | Blin | ...................... G01C 19/721 356/460 |
| 8,395,782 | B2 | | 3/2013 | Patel et al. | |

* cited by examiner

*Primary Examiner* — Michelle R Connelly
(74) *Attorney, Agent, or Firm* — Roger D. Emerson; Emerson Thomson Bennett, LLC

(57) ABSTRACT

A Sagnac interferometer event sensing device is disclosed. The device includes first and second light sources respectively emitting first and second light beams at first and second, different wavelengths. The device includes an optical fiber path, a first portion along which only the first light beam travels, a second portion along which only the second light beam travels, and a third portion along which both the first and second light beams travel. The device includes a first detector at an end of the first portion of the optical path to receive the first light beam, and a second detector at an end of the second portion of the optical path to receive the second light beam. The device includes a first plurality of depolarizers disposed along the first portion of the optical fiber path, and a second plurality of depolarizers disposed along the second portion of the optical fiber path.

10 Claims, 1 Drawing Sheet

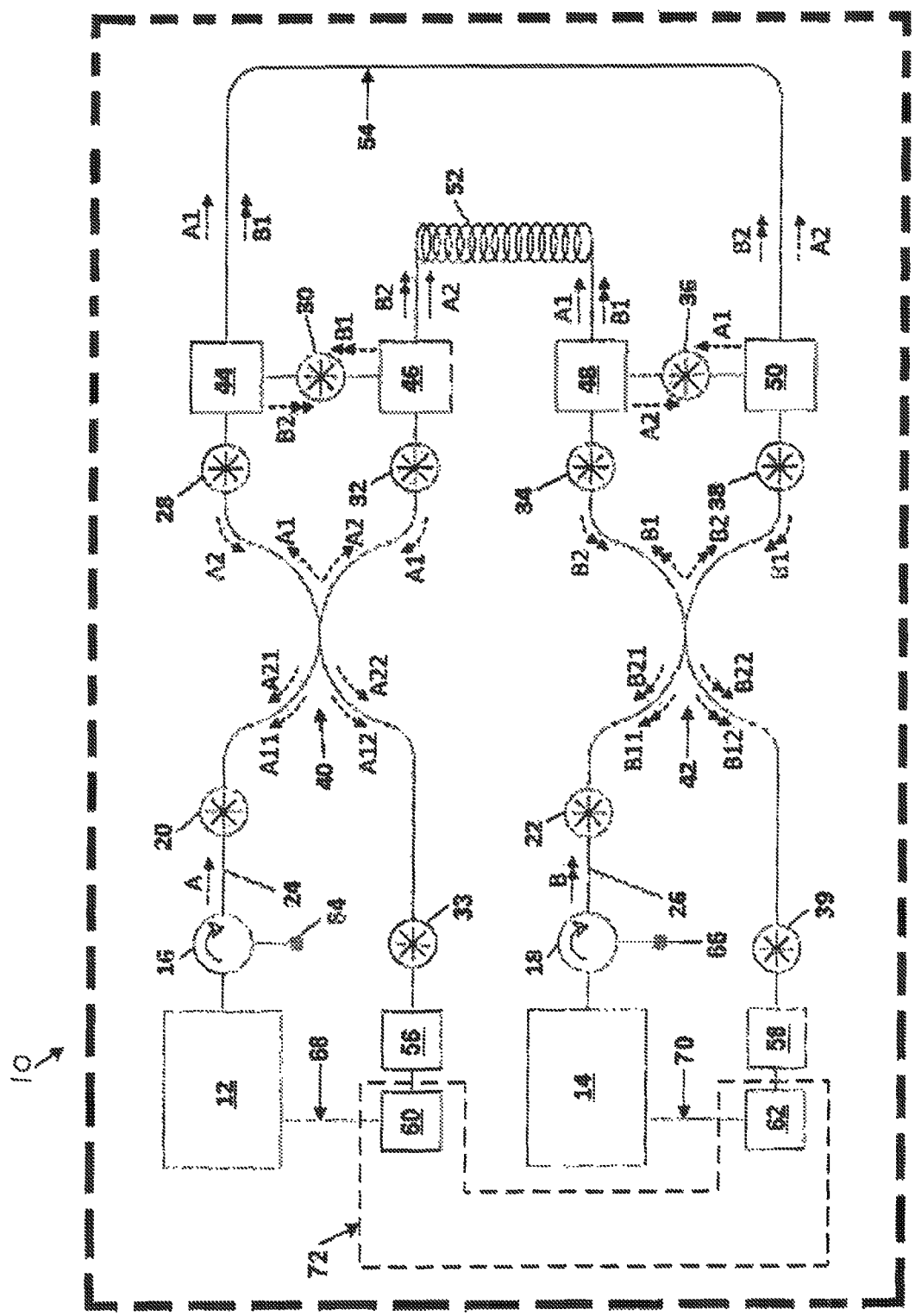

SAGNAC INTERFEROMETER EVENT SENSING AND LOCATING DEVICE

CROSS-REFERENCE TO RELATED APPLICATIONS

This application claims the benefit of U.S. Provisional Patent Application Ser. No. 61/684,164 for a SAGNAC INTERFEROMETER EVENT SENSING DEVICE, filed on Aug. 17, 2012, which is hereby incorporated by reference in its entirety.

BACKGROUND OF THE INVENTION

1. Field of the Invention

The invention relates to a fiber optic based interferometer sensing device operable to sense a disturbance along a signal path and provide a location of the event.

2. Description of Related Prior Art

U.S. Pat. No. 6,459,486 discloses a single fiber Sagnac fiber sensing system. The system includes a generally broadband, low coherence length light source that injects light into a fiber beam splitter that is used to generate counter propagating light beams in a Sagnac loop. The loop includes two facing fiber beam splitters connected together at differing length inner legs, with one of the output legs of the second beam splitter usually being connected to an optical fiber that ends with a phase modulator followed by a mirror. Environmental effects at the optical fiber impress relative phase differences between the counter propagating light beams, which are detected from an interferometric signal that results therefrom.

SUMMARY OF THE INVENTION

In summary, the invention is a Sagnac interferometer event sensing device. The device includes a first light source operable to emit a first light beam. The device also includes a second light source operable to emit a second light beam. The device also includes an optical fiber path including a first portion along which only the first light beam travels, a second portion along which only the second light beam from the second light source travels, and a third portion along which both of the first and second light beams travel. The device also includes a first detector disposed at an end of the first portion of the optical fiber path to receive the first light beam. The device also includes a second detector disposed at an end of the second portion of the optical fiber path to receive the second light beam. The device also includes a first plurality of depolarizers disposed along the first portion of the optical fiber path. The device also includes a second plurality of depolarizers disposed along the second portion of the optical fiber path. The first and second light beams are at first and second, different characteristic wavelengths.

BRIEF DESCRIPTION OF THE DRAWINGS

Advantages of the present invention will be readily appreciated as the same becomes better understood by reference to the following detailed description when considered in connection with the accompanying drawing wherein:

FIG. 1 is a general schematic of an exemplary embodiment of the invention.

DETAILED DESCRIPTION OF EXEMPLARY EMBODIMENTS

An exemplary Sagnac interferometer according to one embodiment of the broader invention makes use of counter-propagating light waves that travel through the signal path and exit together creating an interference light wave. The signal path is sensitive to outside disturbances such as vibration, impact, acoustic noise, changes in pressure, and localized strain. These outside disturbances create a time change in the phase difference between the counter-propagating light waves which results in a change in the interference light wave dependent upon the location of the disturbance along the signal path. By utilizing a detecting device and a processor this interference light wave can be characterized and used to determine the location of the disturbance along the signal path.

It is noted that U.S. Pat. No. 6,459,486 is incorporated by reference to this application.

FIG. 1 shows a schematic of an exemplary embodiment of the invention, a dual wavelength Sagnac interferometer 10. The Sagnac interferometer 10 utilizes two discrete light sources 12, 14, each emitting a narrow-band light at a different characteristic wavelength. A typical light source cannot emit light of a single wavelength, rather they emit light in a range of wavelengths at different intensities. These sources typically have a characteristic wavelength that has the highest intensity in the spectrum. A non-limiting example is a light source configured to emit light with a characteristic wavelength of 1310 nm. In practice the light emitted may actually be between 1250 nm and 1350 nm where the peak intensity is substantially at 1310 nm. In FIG. 1, light at a first characteristic wavelength is represented by a dashed-line coupled to a single arrow head and light at a second characteristic wavelength different from the first characteristic wavelength is represented by a dashed-line coupled to a double arrow head. The second characteristic wavelength can be 1550 nm.

The use of light sources with different wavelengths that are coupled into a single fiber allow the two separate Sagnac loops to share the same sensor loop without interfering with one another. It would be possible to use a single wideband light source split into two bands, but the using two light sources emitting different wavelengths makes it more convenient for independent power level control for each wavelength to achieve loop balance, and in addition reduces crosstalk between the two interferometers.

The light from each light source 12, 14 can pass through respective circulators 16, 18, depolarizers 20, 22, and beam splitters 40, 42. The circulators 16, 18 can separate light beams that travel in opposite directions in the respective optical fibers 24, 26 acting to pass light from the respective light source 12, 14 yet prevent light from traveling into the respective light source 12, 14. The depolarizers 20, 22 can scramble the polarization of the light passing through the fibers 24, 26. Other depolarizers are applied in the exemplary embodiment and are referenced at 28, 30, 32, 33, 34, 36, 38, and 39. In the '486 patent, the "polarization scrambling elements" are depolarizers. A beam splitter can act to divide a single light beam, entering any of four ports, into two light beams at a specific power ratio such that the two light beams differ only in intensity with ratios in the optimal range of 30/70 to 70/30 but ideally 50/50.

The light from the light sources 12, 14 is imposed on a fiber sensing loop 54 by wavelength-division multiplexing couplers (hereafter WDM couplers), thereby ensuring both light sources traverse the same optical path. The WDM couplers are referenced at 44, 46, 48, and 50. Generally, WDM couplers multiplex a number of optical carrier signals onto a single optical fiber by using different wavelengths. A WDM coupler can take two light beams having two different characteristic wavelengths and combine them to be multiplexed in the same waveguide or fiber.

A WDM coupler can have three ports. A first port can be operable to pass into and out of the WDM coupler the first characteristic wavelength and to block light having a wavelength substantially different from the first characteristic wavelength while a second port can be operable to pass into and out of the WDM coupler the second characteristic wavelength and to block light having a wavelength substantially different from the second characteristic wavelength. A third port can be operable to pass into and out of the WDM coupler the first characteristic wavelength and the second characteristic wavelength.

The exemplary embodiment also includes a compensation loop 52. The compensation loop 52 can be used to offset the normal Sagnac response to a perturbation to the optical path, or optical loop. A Sagnac interferometer contains an insensitive region near the center of the loop formed by fiber sensing loop 54 and compensation loop 52. By placing the offset at opposing ends of the sensing loop 54 for the two different frequencies of light, the compensation loop 52 allows a differentiable signal to be obtained from each frequency and places the insensitive region outside of the fiber sensing loop 54.

It is desirable that the state of polarization of the light beams remain randomized to ensure that components of the interfered signal are always available to an optical detector for processing. This is due to a resulting ability to use low cost telecommunications grade optical fiber which is in common use and avoids the necessity of higher cost polarization-maintaining fiber. It also enables the system to be used in the case that a low cost telecommunications fiber is already installed and being used for other purposes. The placement of the polarization randomizing components, the depolarizers, in an optical system has been found to be important to the proper and uniform functioning of the Sagnac interferometry system. Both static and dynamic polarization randomizing components can be employed in embodiments of the invention, but for the sake of compactness, static polarization randomizers are typically used (wavelength specific, fused polarization-maintaining fiber type can be applied).

In the exemplary embodiment of the invention, there are five depolarizers for each wavelength. Depolarizers 20, 28, 32, 33 and 36 act on light from the light source 12. Depolarizers 22, 30, 34, 38, and 39 act on light from the light source 14. For each wavelength of light, a depolarizer is positioned near the light source, at the beginning, midpoint, and end of the loop, and optionally, one depolarizer at the input of the detector. It has been found that positioning the depolarizers in such a manner enhances the likelihood of polarization randomization in most operating environments. This increases the reliability of the sensing loop 54 to the point that it can be considered for inclusion in a critical system, such as security monitoring.

In the exemplary embodiment, light source 12 generates light beam A which passes through circulator 16 and continues through depolarizer 20 which acts to scramble the polarization pattern generated by light source 12. Light beam A then travels to beam splitter 40 and counter-propagating light beams A1 and A2 are generated. Light source 14 generates light beam B which passes through circulator 18 and continues through depolarizer 22 which acts to scramble the polarization pattern generated by light source 14. Light beam B then travels to beam splitter 42 and counter-propagating light beams B1 and B2 are generated.

Light beam A1 travels through depolarizer 28, WDM coupler 44, fiber sensing loop 54, WDM coupler 50, depolarizer 36, WDM coupler 48, compensation loop 52, WDM coupler 46, and depolarizer 32 before arriving back at beam splitter 40. Light beam A2 counter-propagates around the same path in reverse order. Since these two light beams travel the same path they are likely to have an interference condition that is representative of the location of any disturbance event that may have occurred within the loop. Since the sensitivity at the center of a Sagnac loop is zero the exemplary embodiment is used in such a way that the disturbance event occurs only in fiber sensing loop 54.

After propagating around the loop, light beam A1 is again divided by beam splitter 40 into light beams A11 and A12. Likewise, light beam A2, after propagating around the loop, is divided into light beams A21 and A22. Light beams A12 and A22 are divided parts of the counter propagating light beams and therefore will interfere with one another, become depolarized by the optional depolarizer 33, and pass into detector 56. Detector 56 is operable to convert the interference light beam made up of light beams A12 and A22 into an electrical signal that can be interpreted by processor sub-element 60.

Because the beam splitter functions the same regardless of the port into which the light passes, light beams A11 and A21 are also created but they are not necessary to detect even though they have the same interfering characteristics as light beams A12 and A22. Therefore, light beams A11 and A21 pass through depolarizer 20 and into circulator 16 where they exit into light absorption node 64 which in some embodiments can be an integral part of circulator 16.

Light beam B1 travels through depolarizer 34, WDM coupler 48, compensation loop 52, WDM coupler 46, depolarizer 30, WDM coupler 44, fiber sensing loop 54, WDM coupler 50, and depolarizer 38 before arriving back at beam splitter 42. Light beam B2 counter-propagates around the same path in reverse order. Since these two light beams travel the same path they are likely to have an interference condition that is representative of the location of a disturbance event that may have occurred within the loop. Since the sensitivity at the center of a Sagnac loop is zero the exemplary embodiment is used in such a way that the disturbance event occurs only in fiber sensing loop 54.

After propagating around the loop, light beam B1 is again divided by beam splitter 42 into light beams B11 and B12. While, light beam B2, after propagating around the loop, is divided into light beams B21 and B22. Light beams B12 and B22 are divided parts of the counter propagating light beams and therefore will interfere with one another, become depolarized by the optional depolarizer 39, and pass into detector 58. Detector 58 is operable to convert the interference light beam made up of light beams B12 and B22 into an electrical signal that can be interpreted by processor sub-element 62.

Because the beam splitter functions the same regardless of the port into which the light passes, light beams B11 and B21 are also created but they are not necessary to detect even though they have the same interfering characteristics as light beams B12 and B22. Therefore, light beams B11 and B21 pass through depolarizer 22 and into circulator 18 where they exit into light absorption node 66 which in some embodiments can be an integral part of circulator 18. In some embodiments of the present invention, the depolarizer located at the input to each detector, polarizers 33 and 39, are removed.

Processor 72, consisting of both sub-elements 60, 62, can be operable to interpret the combination of electrical signals generated by the detectors 56, 58 in order to determine the location of the disturbance event along the length of fiber sensing loop 54.

In some embodiments of the invention, the detectors 56, 58, along with the processor sub-elements 60, 62, are further operable to detect the power level entering the respective detector. Processor 72 can be further operable to compare the power levels, as detected by each detector 56, 58 and actively control the power levels of the light beam as generated by the light sources 12, 14. This can be accomplished by enabling the processor sub-elements 60, 62 to control the electrical power of the respective light source 12, 14 through the electrical control lines 68, 70. This is known as Active Power Control and can be applied to effectively balance the detected optical power levels associated with both wavelengths automatically, thereby preserving the ratios of the two power levels used to determine the position of the disturbance along the optical fiber path.

As a part of the functionality of the processor sub-elements 60, 62, the power signal is sensed by applying the detected light beam to a DC amplifier with a low pass response. The resultant DC level is amplified and conditioned, producing an error signal which is used to correct the drive signal passed through the electrical control lines 68, 70, to the corresponding light source. This active power control can be accomplished continuously with analog circuitry, or discretely with a digital system. Furthermore, the digital system power balance can be stabilized at a control loop frequency commensurate with the application, i.e., in an application high frequency acoustic signals, the stabilization loop frequency can be lower than the cutoff frequency of the data, but fast enough to keep the loop in balance. Loop imbalance can occur due to environmental temperature changes, dimensional changes caused by temperature or humidity, or the presence, change, or absence of building or ground loading.

The exemplary embodiment of the invention provides other advantages as well. The components of the exemplary embodiment can be packaged together. Thus, sensing devices according to at least some embodiments of the invention can be disposed at one physical location.

It has been observed that the embodiment of the invention exhibits relatively low system noise. This advantage is partly due to the low noise characteristics of the Super Luminescent Diode (SLD) used as at least one of the light sources 12, 14. The noise is further avoided by operating the detectors 56, 58 in photovoltaic mode. In this photovoltaic mode, zero bias voltage is used which allows the voltage to build up on the detector instead of conduct through the detector. This is as opposed to a photoconductive mode wherein the detector is reverse biased.

The exemplary embodiment has been found to be particularly versatile in application. For example, the exemplary embodiment can be used for many different sensing applications. Embodiments of the invention can be applied in intrusion detection systems. Embodiments can also be used for conduit monitoring, including oil and gas pipelines. Data lines and energy transmission lines can be protected with embodiments of the present invention. Embodiments of the invention can be subject to direct burial in earth or concrete, submersion in liquid mediums, and/or exposure to atmosphere. Embodiments of the invention can be utilized to sense vibration and/or to monitor structural health, including structures such as platforms. Embodiments of the invention can also be used to monitor traffic conditions and conduct surveillance.

Another advantage of the exemplary embodiment is that the sensing fibers, such as 54, can also carry data and/or other sensor information (such as Fiber Bragg Grating (FBG) sensor loops) through additional WDM couplers. For example, the exemplary embodiment of the invention can include a FBG sensor array. Such a sensor array could be a hybrid detection system operable to detect more than one condition, such as intrusion, strain, and temperature. It is further noted that data at different wavelengths can be transmitted through the fibers in various embodiments of the broader invention.

The exemplary embodiment can also incorporate components operable to conduct a Built-In Self-Test (BIT). An impulse generating device can be placed at a known position along the fiber sensing loop 54. Generally, the center of the fiber sensing loop is chosen, but other locations can be selected. A command can be issued from the interrogator unit. The resultant interferometric signals can be measured, and a finer degree of balance can be achieved by balancing the two signals. This function could be performed on command, or could be accomplished automatically at prescribed intervals.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Further, the "invention" as that term is used in this document is what is claimed in the claims of this document. The right to claim elements and/or sub-combinations that are disclosed herein as other inventions in other patent documents is hereby unconditionally reserved.

What is claimed is:

1. A Sagnac interferometer event location sensing device comprising:
   a first light source operable to emit a first light beam having a first characteristic wavelength;
   a first beam splitter operatively positioned to receive the first light beam and operable to split the first light beam into a second and third light beam;
   a second light source operable to emit a fourth light beam having a second characteristic wavelength wherein the second characteristic wavelength is different from the first characteristic wavelength;
   a second beam splitter operatively positioned to receive the fourth light beam and operable to split it into a fifth and sixth light beam;
   a plurality of WDM couplers, each comprising:
      a first port operable to pass into and out of the WDM coupler the first characteristic wavelength and to block light having a wavelength substantially different from the first characteristic wavelength;
      a second port operable to pass into and out of the WDM coupler the second characteristic wavelength and to block light having a wavelength substantially different from the second characteristic wavelength; and
      a third port operable to pass into and out of the WDM coupler the first characteristic wavelength and the second characteristic wavelength;
   wherein the plurality of WDM couplers includes:
      a first WDM coupler having its first port operatively positioned to receive the second light beam;
      a second WDM coupler having its first port operatively positioned to receive the third light beam;
      a third WDM coupler having its second port operatively positioned to receive the fifth light beam;
      a fourth WDM coupler having its second port operatively positioned to receive the sixth light beam;
   a first optical fiber path operatively connecting the third port of the first WDM coupler to the third port of the fourth WDM coupler, said first optical fiber path being exposed to at least one disturbance to be sensed;

a second optical fiber path operatively connecting the third port of the second WDM coupler to the third port of the third WDM coupler;

a third optical fiber path operatively connecting the second port of the first WDM coupler to the second port of the second WDM coupler;

a fourth optical fiber path operatively connecting the first port of the third WDM coupler to the first port of the fourth WDM coupler;

a plurality of depolarizers each operable to scramble the polarization of the light passing through including:
  a first depolarizer operatively positioned in the path of the first light beam;
  a second depolarizer operatively positioned in the path of the fourth light beam;
  a third depolarizer operatively positioned in the path of the second light beam and prior to the first port of the first WDM coupler;
  a fourth depolarizer operatively positioned in the path of the third light beam and prior to the first port of the second WDM coupler;
  a fifth depolarizer operatively positioned in the path of the fifth light beam and prior to the second port of the third WDM coupler;
  a sixth depolarizer operatively positioned in the path of the sixth light beam and prior to the second port of the fourth WDM coupler;
  a seventh depolarizer operatively positioned in the third optical fiber path; and
  an eighth depolarizer operatively positioned in the fourth optical fiber path;

a first detecting means operatively connected to the first beam splitter to receive a first interference light beam from said first beam splitter and to produce a first electrical signal containing a first information set regarding the at least one disturbance;

a second detecting means operatively connected to the second beam splitter to receive a second interference light beam from said first beam splitter and to produce a second electrical signal containing a second information set regarding the at least one disturbance;

a processor operable to receive the first electrical signal and the second electrical signal, extract the first information set from the first electrical signal and the second information set from the second electrical signal, and create a third information set comprising the location of the at least one disturbance along the first optical fiber path.

2. The Sagnac interferometer event location sensing device of claim 1 wherein the second optical fiber path, third optical fiber path, and fourth optical fiber path are a non-polarization preserving optical fiber path.

3. The Sagnac interferometer event location sensing device of claim 1 further comprising:
  a first WDM data communications coupler operatively positioned near a first end of the first optical fiber path and operable to pass the first and second characteristic wavelengths and to couple onto and off of the first optical fiber path, a data communications wavelength substantially different from the first and second characteristic wavelengths; and
  a second WDM data communications coupler operatively positioned near a second end of the first optical fiber path and operable to pass the first and second characteristic wavelengths and to couple onto and off of the first optical fiber path, the data communications wavelength.

4. The Sagnac interferometer event location sensing device of claim 3 further comprising:
  a first WDM sensor data coupler operatively positioned at a first point along the first optical fiber path and operable to pass the first and second characteristic wavelengths, to pass the data communications wavelength, and to couple onto and off of the first optical fiber path, a sensor data wavelength substantially different from the first and second characteristic wavelengths and from the data communications wavelength; and
  a second WDM sensor data coupler operatively positioned at a second point along the first optical fiber path and operable to pass the first and second characteristic wavelengths, to pass the data communications wavelength, and to couple onto and off of the first optical fiber path, the sensor data wavelength.

5. The Sagnac interferometer event location sensing device of claim 1 further comprising:
  a first WDM sensor data coupler operatively positioned at a first point along the first optical fiber path and operable to pass the first and second characteristic wavelengths and to couple onto and off of the first optical fiber path, a sensor data wavelength substantially different from the first and second characteristic wavelengths; and
  a second WDM sensor data coupler operatively positioned at a second point along the first optical fiber path and operable to pass the first and second characteristic wavelengths and to couple onto and off of the first optical fiber path, the sensor data wavelength.

6. The Sagnac interferometer event location sensing device of claim 1 wherein said first and second beam splitters act to divide the power of the incoming light into substantially equal parts.

7. The Sagnac interferometer event location sensing device of claim 1 wherein the processor is further operable to enact active power control by controlling the power input to at least one of the first and second light sources based on at least one of the first and second electrical signals.

8. The Sagnac interferometer event location sensing device of claim 1 further comprising:
  an impulse generator operatively positioned at a known distance along the first optical fiber path, electrically connected to the processor, and operable to create a calibration disturbance in response to an electrical command signal created by the processor wherein the processor is further operable to determine a calibration information set based on at least one of the first and second electrical signals received in response to the calibration disturbance.

9. The Sagnac interferometer event location sensing device of claim 1 wherein the fourth optical fiber path is of substantially the same length as the second optical fiber path.

10. The Sagnac interferometer event location sensing device of claim 1 wherein the plurality of depolarizers further includes:
  a ninth depolarizer operatively positioned between the first detecting means and the first beam splitter; and
  a tenth depolarizer operatively positioned between the second detecting means and the second beam splitter.

* * * * *